United States Patent Office 3,752,770
Patented Aug. 14, 1973

3,752,770
MULTIFUNCTIONAL EMULSIFICATION AGENTS
Bruce D. Buddemeyer, Morris Plains, N.J.
(D3 Birchwood Drive, Fredonia, N.Y. 14063)
No Drawing. Filed May 13, 1970, Ser. No. 37,014
Int. Cl. B01f 17/34, 17/36
U.S. Cl. 252—356                                7 Claims

ABSTRACT OF THE DISCLOSURE

There are disclosed powdered, free flowing, relatively non-hygroscopic emulsification compositions for improving the physical properties and quality of food products and especially carbohydrate containing food products, confections and prepared mixes. The emulsification agents are compositions of matter which contain co-acting constituents consisting essentially of (a) from 20 to 80 parts by weight of at least one of the aliphatic polyol esters of the fatty acids having from 10 to 24 carbons, glyceryl lactopalmitate, glyceryl lactostearate, succinylated monoglycerides, and acetylated tartaric acid esters of mono- and diglycerides, (b) from 80 to 20 parts by weight of at least one polyoxyethylene derivative of any of said polyol esters of fatty acids and having a total of from about 5 to 100 moles of ethylene oxide per mole of said polyol ester; and (c) a hydrogenated triglyceride to the extent of from 20 to 80 weight percent of said composition.

The present invention relates to new compositions of matter, process of manufacture and the use of these novel and unique compositions which contain mixtures of polyol esters of fatty acids and certain polyoxyethylene derivatives in powdered, free flowing form and rendered relatively free of hygroscopicity. It has been discovered that certain polyol ester emulsification mixtures are more effective and have greater utility, for example, in food products, especially baked carbohydrate food products, cosmetic and pharmaceutical preparations, than their individual ingredients.

More particularly the invention is that of emulsification mixtures containing one or more of certain polyol esters of fatty acids and certain derivatives thereof (more fully described below) enhanced by admixture with fully hydrogenated biologically suitable triglycerides derived from animal or vegetable sources optionally combined with a suitable anti-caking agent.

A unique feature of the invention is the provision that these polyol ester emulsification mixtures which, for example, when incorporated in the doughs for bakery products, particularly for baked leavened products, considerably improve one or more of their various physical properties and quality above what could be expected from the addition of the respective amounts of the individual ingredients.

Another feature of this invention is the provision that the improved, dry, free-flowing emulsification mixtures can be water dispersed or hydrated just prior to use thus providing enhanced utility in many applications.

A further feature of this invention is the provision of improved mixtures of emulsification agents which, when included as ingredients in icings, fillings, fondants, creams, candy and the like, significantly improve their properties and usefulness.

Other features of the invention will be recognized from the following more detailed description of it.

The production of bakery products, and particularly bread, is a highly competitive industry and these products are critically scrutinized by a discriminating public. A variety of additives have been employed over the years to ameliorate the variations in ingredients and bake shop conditions and equipment as well as improve dough handleability, over all product quality and provide anti-staling characteristics to the finished products. Certain polyol esters of fatty acids, i.e. mono-diglycerides, are probably as familiar an ingredient to the baker as any in this category. They have been used for years and have found wide acceptance by providing firmness retarding activity and improvement in crumb color, grain, texture, symmetry and specific volume.

More recently, the polyoxyethylene derivatives of polyol esters of fatty acids have been employed in this same area and function in a similar manner as the forementioned polyol esters in certain respects and somewhat different in others. These derivatives do not offer the same degree of crumb firming retardation but do offer remarkable dough or gluten strengthening properties and definite volume producing attributes.

Since it has been found that polyol esters of fatty acids and certain of their polyoxyethylene derivatives complement each other, are physically compatible and from a commercial standpoint quite economical compared to many of the dough improvers and emulsifiers currently employed, mixtures of these materials are being employed by the modern day baker. However, certain limitations are inherently imposed on these mixtures due to the physical properties of these two systems. Due to the low melting point, 30°–33° C., and the hygroscopic nature of the commercially available form of the polyoxyethylene derivatives, even for example if a fully hydrogenated distilled monoglyceride is used in combination, a 40–60 ratio respectively presents compaction and lumping problems which are further complicated by the hygroscopic tendencies of the polyoxyethylene derivative. A prime facet of this discovery is the alleviation of this problem at even higher ratios of the ethoxylated derivatives.

The enhanced emulsifying mixtures of the invention comprise two segments of the class of polyol esters of fatty acids. Class 1 may be described as embracing polyol esters of fatty acids and several derivatives thereof, excluding the polyoxyethylene derived compounds, for example, the mono- and mono- and di-fatty acid esters of aliphatic polyhydric alcohols or the hereinbelow indicated derivatives of them, having from two (2) to about six (6) hydroxy groups linked to the aliphatic chain. The more effective polyhydric alcohols are those having fewer than about twelve (12) carbons in the aliphatic chain.

Examples of the aliphatic polyhydric alcohols include the dihydric alcohols such as ethylene glycol, propylene glycol, butylene glycol, isobutylene glycol, hexylene glycol, and the like; the trihydric alcohols such as glycerol, 2-methyl-1,2,3-propanetriol, 1,2,3-butanetriol, 1,2,4-butanetriol, and 1,2,6-hexanetriol; and aliphatic higher polyols such as sorbitol and mannitol.

The fatty acid whose acyl group is that of the polyol esters can have from 10 to 24 carbons.

More effective among the examples of the mono- and di-fatty acid esters of these aliphatic polyhydric alcohols, so far as presently observed, are the mono-fatty acid esters of glycerol, commonly called the mono-glycerides which, as is known, generally include varying residual minor amounts of di- and tri-glycerides, for example, at least 10 and up to 90 weight percent of monoglyceride with di-glycerides, triglycerides and a trace of glycerine constituting the balance, such as glyceryl monostearate, glyceryl monopalmitate or other related esters as propylene glycol monostearate, glyceryl lactopalmitate and glyceryl lactostearate; succinylated glyceryl monostearate, acetylated tartaric acid esters of mono- and di-glycerides and sorbitan monostearate.

The second segment of the class of polyol esters of fatty acids, class 2, may be represented by polyoxyethylene ($n$) glyeryl monostearate or monopalmitate and polyoxyethylene ($n$) sorbitan monostearate or monopalmitate, in either of which $n$ can be from about five (5) to one hundred (100) and advantageously up to about twenty (20); including mixtures of any of these various esters.

The polyoxyethylene derivatives of the aliphatic polyol esters of the fatty acids are the condensation products of from 10 to 95 parts by weight ethylene oxide and correspondingly from 90 to 5 parts by weight of the earlier mentioned partial glycerol esters.

The emulsification compositions of the invention include from 20 to 80 parts by weight of the polyol esters of fatty acids per from 80 to 20 parts by weight of the polyoxyethylene derivatives of these esters. Also, these emulsification compositions can contain from 20 to 80 weight percent of the hydrogenated triglycerides (i.e. hard fat).

The polyoxyethylene derivatives of polyol esters of fatty acids referred to above are familiar to the art of baking and food preparation and may typically be produced as described in U.S. Pat. No. 3,433,645 and No. 3,490,918.

To exemplify typical emulsification mixtures containing one or more of the polyol esters of fatty acids and a polyoxyethylene derivative of polyol esters of fatty acids admixed with fully hydrogenated triglycerides derived from animal or vegetable sources, such as lard, tallow, soy bean meal, corn oil, cotton seed oil, safflower oil, and peanut oil, and optionally combined with a suitable anticaking agent, the following formulas are presented.

PREPARATIONS (1)

Weight percent

Ethoxylated monoglycerides (Starfol D, Ashland Chemical Co.) _____ 23
Hydrogenated monoglycerides, 52% min. alpha monoester. (Durem 287, Durkee Famous Foods) _____ 12
Hydrogenated tallow triglyceride (Glycon HTG, Glyco Chemicals, Inc.) _____ 65

(2)

Distilled monostearin (Myverol 18-00, distilled monoglyceride from fully hydrogenated lard, 90% minimum monoester, Distillation Products Industries) _ 10
Polysorbate 60 (Tween 60, Atlas Chemical Co.) ____ 20
Hydrogenated triglyceride (Glycon HTG) _____ 70

(3)

Ethoxylated monoglycerides (Starfol D) _____ 20
Hydrogenated monoglycerides (Durem 287) _____ 35
Hydrogenated triglyceride (Glycon HTG) _____ 40
Calcium phosphate tribasic _____ 5

(4)

Ethoxylated monoglycerides (Starfol D) _____ 12
Hydrogenated monoglyceride (Durem 287) _____ 7
Hydrogenated triglyceride (Glycon HTG) _____ 80
Sodium silico aluminate (Zeolex 23A, J. M. Huber Corporation) _____ 1

(5)

Ethoxylated monoglycerides (Starfol D) _____ 32
Hydrogenated monoglycerides (Durem 287) _____ 8
Hydrogenated triglyceride (Glycon HTG) _____ 55
Silicon dioxide (Zeofree 80, J. M. Huber Corporation) _____ 5

(6)

Hydrogenated monoglycerides, 40% minimum alpha monoester (Starfol GMS 400, Ashland Chemical Co.) _____ 64
Hydrogenated triglyceride (Glycon HTG) _____ 20
Polysorbate 60 (Tween 60) _____ 16

(7)

Ethoxylated monoglycerides (Aldosperse MS-20, Glyco Chemicals, Inc.) _____ 23
Distilled monostearin (Myverol 18-07) _____ 7
Hydrogenated triglyceride (Glycon HTG) _____ 66
Magnesium carbonate _____ 4

(8)

Hydrogenated monoglyceride, 42% minimum alpha monoester (Durem 114, Durkee Famous Foods) __ 10
Hydrogenated triglyceride (Glycon HTG) _____ 62
Polysorbate 60 (Tween 60) _____ 25
Calcium sulphate _____ 3

(9)

Ethoxylated monoglycerides (Aldosperse MS-20) __ 10
Hydrogenated triglyceride (Glycon HTG) _____ 63
Polysorbate 60 (Tween 60) _____ 10
Propylene glycol monostearate (Durkee Famous Foods) _____ 5
Glyceryl lactostearate (Durkee Famous Foods) ____ 10
Calcium carbonate _____ 2

(10)

Ethoxylated monoglycerides (Starfol D) _____ 15
Monoglycerides, 42% minimum alpha monoester, non-hydrogenated (Durkee Famous Foods) _____ 15
Hydrogenated triglyceride (Glycon HTG) _____ 60
Polysorbate 60 (Tween 60) _____ 5
Succinylated monoglycerides (National Dairy Products Corp.) _____ 5

(11)

Ethoxylated monoglycerides (Starfol D) _____ 5
Distilled monostearin (Myverol 18-00) _____ 10
Hydrogenated triglyceride (Glycon HTG) _____ 60
Acetylated tartaric acid esters of mono- and diglycerides (TEM, Hachmeister, Inc.) _____ 7
Polysorbate 60 (Tween 60) _____ 10
Glyceryl lactostearate (Durkee Famous Foods) ____ 5
Calcium phosphate tribasic _____ 3

(12)

Ethoxylated monoglycerides (Starfol D) _____ 23
Hydrogenated monoglycerides (Durem 287) _____ 12
Hydrogenated triglycerides (Glycon HTG) _____ 60
Calcium stearate _____ 5

(13)

Ethoxylated monoglycerides (Aldosperse MS-20) ___ 15
Monoglycerides, 42% minimum alpha monoesters, non-hydrogenated (Durkee Famous Foods) _____ 20
Hydrogenated triglyceride (Glycon HTG) _____ 56
Polysorbate 60 (Tween 60) _____ 5
Calcium phosphate tribasic _____ 4

(14)

Ethoxylated monoglycerides (Aldosperse MS-20) __ 27
Hydrogenated monoglyceride (Durem 287) _____ 5
Distilled monostearin (Myverol 18-00) _____ 5
Hydrogenated triglyceride (Glycon HTG) _____ 60
Sodium silico aluminate (Zeolex 7) _____ 3

(15)

| | |
|---|---|
| Ethoxylated monoglycerides (Aldosperse MS-20) | 15 |
| Hydrogenated monoglyceride, 42% minimum alpha monoester (Durem 114) | 40 |
| Hydrogenated triglyceride (Glycon HTG) | 43 |
| Calcium stearate | 2 |

(16)

| | |
|---|---|
| Polysorbate 60 (Tween 60) | 15 |
| Succinylated monoglycerides | 15 |
| Hydrogenated triglyceride (Glycon HTG) | 67 |
| Magnesium carbonate | 3 |

(17)

| | |
|---|---|
| Hydrogenated monoglyceride, 42% minimum alpha monoester (Durem 114) | 10 |
| Acetylated tartaric acid esters of mono- and diglycerides (TEM) | 15 |
| Polysorbate 60 (Tween 60) | 10 |
| Hydrogenated triglyceride (Glycon HTG) | 64 |
| Calcium phosphate tribasic | 1 |

(18)

| | |
|---|---|
| Ethoxylated monoglyceride (Starfol D) | 10 |
| Distilled monostearin (Myverol 18-07) | 6 |
| Polysorbate 60 (Tween 60) | 10 |
| Hydrogenated triglyceride (Glycon HTG) | 63 |
| Propylene glycol monostearate (Durkee Famous Foods) | 9 |
| Sodium silico aluminate (Zeolex 7) | 2 |

Referring to the above exemplary formulations, the polyol esters of fatty acids, the polyoxyethylene derivatives of the polyol esters of fatty acids and the hydrogenated triglycerides are melted together and the resultant mixture is then spray chilled to produce a powder sufficiently fine to pass about a 40 mesh or finer U.S. Standard Sieve. Alternately, the above described melt may be beaded or flaked and subsequently ground to a fine powder with or without the aid of an anti-caking agent. Due to the heat of friction during grinding, a cooling jacket on the pulverizer may be required or a Dry Ice can be added with the emulsification agent as it is fed to the mill.

The resultant powder is then sized by passing it through a screen, typically a 40 to 60 mesh, and any coarse material is recycled through the milling process. The final product normally exhibits a white to cream color, is a free flowing powder and relatively free of hygroscopicity. A prime facet of the invention is displayed by substantial alleviation of serious compaction and lumping problems normally encountered if the hydrogenated triglyceride and an optional anti-caking agent is not employed.

It should be noted that if the ratio of ethoxylated monoglyceride to monoglyceride ratio exceeds 40 to 60 or if the ratio of monoglycerides to hard fat exceeds 30 to 70, it is advantageous to employ an anti-caking agent to insure that the finished product will be free flowing and relatively non-hygroscopic. Calcium phosphonate tribasic, magnesium carobnate, sodium silico aluminate, silicon dioxide, calcium stearate, calcium sulphate, calcium carbonate or other finely powdered anti-caking agents of choice dependent upon the emulsification ingredient ratios may be employed. These agents aid in preventing the fatty materials from agglomerating and assist in producing a homogeneous distribution of the emulsification agent through the dough or batter forming ingredients.

Experimental baking studies were conducted comparing the active ingredients of the emulsification agents per se with the identical level of these same compounds in the same ratio but in the dry, free flowing, relatively non-hygroscopic form as described in this invention. The surprising functionality of the improved emulsification agents was demonstrated conclusively in the following yeast and chemically leavened baked product formulations.

The white bread formula and baking procedure used in preparing loaves of bread by a conventional sponge and dough method will now be described.

The ingredients utilized are enumerated below with their corresponding percent levels. The percentage values are based on the total flour weight contained in the formula as 100%. Percentage reported in this manner is usually termed "baker's percentage" and implies parts by weight in reference to the total flour as 100 parts.

FORMULA—BAKED UPON 800 GMS. OF FLOUR

| Ingredients | Percent | Weight (gms.) |
|---|---|---|
| Flour (14% M.B.) | 100.00 | 800 |
| Salt | 2.25 | 18 |
| Sucrose | 4.00 | 32 |
| Corn sugar | 5.00 | 40 |
| Lard | 3.00 | 24 |
| Nonfat dry milk | 3.50 | 28 |
| Yeast | 3.00 | 24 |
| Arkady yeast food | 0.50 | 4 |
| Water (variable) | 67-67 | 480-536 |

The sponge consists of 65% of the total bread flour, 0.50% Arkady yeast food, 3% yeast, and 41.60% water based on the sponge flour weight. The yeast is emulsified in a portion of the sponge water prior to the addition to the flour. These ingredients are mixed in a water-jacketed Hobart mixer, Model A-120. By adjustment of the cold water supply to the insulated jacket surrounding the mixing bowl, a sponge temperature of 80° F. is maintained. The components of the sponge are mixed one-half minute at low speed (48 r.p.m.) and then four minutes at second speed (88 r.p.m.). The resultant sponge is then transferred to a tinned metal trough and fermented 4¼ hours in a fermentation cabinet; constant temperature and humidity are maintained, as measured by a hygrometer, 91% relative humidity with a dry bulb temperature of 80° F.

The sponge is subsequently remixed with the remaining portion of the formula. The dough ingredients consist of 35% of the total flour, 3.50% milk, 2.25% salt, 5.0% corn sugar, 4.0% granulated sucrose, 3.0% lard, and the remaining water. The dough is mixed at low speed (48 r.p.m.) for one-half minute, and usually about 5 minutes at second speed (88 r.p.m.) in a Hobart A-120 mixer. The mixing time is dependent upon the physical characteristics of the particular flour employed. The dough temperature is regulated by adjusting the mixing bowl jacket temperature and the dough water temperature so that the dough comes from the mixer at 80° F.

The dough is then placed in the fermentation cabinet mentioned above for 40 minutes. Following this fermentation period or floor time, two 542 gram dough pieces are scaled. The scaled dough pieces are passed through a dough sheeter initially with a roll clearance of 5/16 inch and then a second time at 7/32 inch. The pieces are then given a 10-minute recovery time on the bench at room temperature covered with polyethylene to minimize moisture loss. This part of the procedure corresponds to an overhead proofer in a commercial bake shop.

Following the 10 minute recovery period, the doughs are again sheeted through rolls set at a distance of 5/16 inch and then molded. The molded dough pieces are panned, numbered and placed in a proof box and allowed to rise at 110° F. dry bulb and 105° F. wet bulb until the top surface of the center of the dough is ¾ inch above the top of the pan. The entire proofing process averages slightly less than 1 hour.

The bread pans utilized have a pan factor of 2.48 sq. in. top pan surface per ounce of dough. Their dimensions are as follows:

Top: 4½ in. x 10 in.
Bottom: 3⅞ in. x 9½ in.
Depth: 3¼ in.

When the dough has risen to the desired volume, it is baked for 21 minutes at a temperature of 425° F. From the oven, the bread is placed on a wire cooling rack for 70 minutes. The loaves are then packaged in air-tight polyethylene bags; uniform cooling is accomplished by spacing the test loaves approximately 2 inches apart on the bench until evaluation is to be made. Room temperature is not carefully controlled, which allows for difference in compressibility from day to day. However, control loaves are baked daily and used as a point of reference.

Following a storage period of usually 18 hours, bread quality is scored according to a modified method used by The American Institute of Baking which is a numerical summary of the internal and external quality factors which have been carefully weighed as to their relative importance. The relative importance of these factors are presented in the table below.

External:
- Volume ------------------------------------- 10
- Crust color --------------------------------- 3
- Symmetry ----------------------------------- 3
- Evenness of bake --------------------------- 3
- Crust character ----------------------------- 3
- Break and shred ----------------------------- 3

25

Internal:
- Grain ---------------------------------------- 19
- Crumb color --------------------------------- 12
- Aroma --------------------------------------- 10
- Taste --------------------------------------- 10
- Chewability --------------------------------- 12
- Texture ------------------------------------- 12

75

Total external and internal --------------- 100

Crumb compressibility is usually measured after storage of the loaves in the air-tight polyethylene containers at room temperature for 18 and 42 hours. The loaves of bread are placed in a miter box and three 2-inch slices are cut from the center of each loaf. A Precision Penetrometer fitted with a disc-shaped plunger 3 cm. in diameter and weighing 265 gms. is employed to measure compressibility. The 3 cm. disc is placed in the center of each slice and allowed to compress the bread crumb for a period of ten seconds at which time its movement is arrested and the depth of penetration measured by means of a dial micrometer calibrated in 0.1 millimeter. An average of six compression values is generally considered a valid measure of crumb compressibility.

Staling or firming is measured as the decrease in compressibility from 18 to 42 hours.

Referring to the preparations described in the above, the emulsification agent numbers 1, 2, 3, 4, 5, 6, 10, 16 and 18 were evaluated in the white bread sponge and dough procedure at a level of 0.50% based on the flour weight. As cited in the following table, the emulsification agents representative of this invention were incorporated in the formula as dry powders as well as slurried with the absorption water. Table 1 summarizes the performance of the emulsification agents as stated above as compared with a no-additive control and the identical level of the active components not in admixture with the hydrogenated triglycerides (coded numerically with an A suffix) in powdered, non-hygroscopic, free flowing form or in liquid dispersion.

TABLE I

| Code | Physical form | Volume (cu. in.) | Quality score | Crumb compressibility (0.1 mm. 18 hrs.) |
|---|---|---|---|---|
| Control | | 161 | 90.1 | 172 |
| 1 | D. | 179 | 93.7 | 218 |
| 1A | U.I. | 177 | 92.9 | 206 |
| 2 | D. | 171 | 90.8 | 221 |
| 2A | U.I. | 172 | 90.7 | 209 |
| 3 | D. | 180 | 93.9 | 226 |
| 3A | U.I. | 178 | 93.1 | 227 |
| 4 | D. | 169 | 91.9 | 228 |
| 4A | U.I. | 170 | 92.0 | 206 |
| 5 | D. | 181 | 93.8 | 221 |
| 5A | U.I. | 177 | 93.1 | 211 |
| 6 | D. | 175 | 92.7 | 229 |
| 6A | U.I. | 173 | 92.1 | 219 |
| 10 | L. | 181 | 93.8 | 219 |
| 10A | U.I. | 179 | 92.4 | 194 |
| 16 | L. | 177 | 92.9 | 222 |
| 16A | U.I. | 177 | 92.8 | 217 |
| 18 | L. | 176 | 93.6 | 231 |
| 18A | U.I. | 172 | 92.9 | 212 |

NOTE.—Abbreviations: D.—dry free flowing powder; L.—liquid dispersion with absorption water; U.I.—untreated ingredients, active emulsifier levels equivalent to the active emulsifiers in the novel emulsification agents.

Each active component of the emulsifier mixtures of the invention is known to be functional and improve one or more of the physical characteristics and quality of the resulting yeast or chemically leavened baked goods. However, if the invention is followed, unexpected advantages and improvements occur in the physical and quality characteristics of the resulting baked products beyond that expected from the mere additive result of the respective quantities used. Such results indicate that there is an apparent synergistic effect from the joint use of the admixed polyol esters of fatty acids, the polyoxyethylene derivatives and fully hydrogenated, biologically suitable, triglycerides in powdered, free flowing form. Such unexpected results are clearly borne out by the results presented in Table I in that when the polyol esters are combined with the polyoxyethylene derivatives and a hydrogenated triglyceride to produce a powdered, free flowing product, a significant improvement in volume, quality score and crumb compressibility is exhibited.

In addition to providing improvement in yeast leavened baked products, the polyol ester mixtures of the invention have been used successfully in many chemically leavened baked goods. The dry, free flowing admixture of the polyol esters and derivatives and hydrogenated fat have particular acceptability in chemically leavened baked products, prepared mixes and, in particular, layer, batter whip and sponge cakes. To exemplify this functionality, dry mixes were prepared as follows:

| Ingredient: | Baker's percent |
|---|---|
| Cake flour | 110 |
| Salt | 3 |
| Baking powder | 7 |
| Sugar | 152 |
| Powdered milk | 11 |
| Egg albumen | 10 |
| Shortening | 30 |
| Emulsifier (variable) | 0.5–5 |

The dry ingredients were blended thoroughly and shortenings were cut into and blended with the mixture, using a Hobart M–50 mixer at low speed.

The batters were prepared in three steps. Each step consisted of adding 57 ml. of water to the batter, mixing at low speed of the mixer for three minutes and scraping down the bowl. Batter temperatures were maintained at 70° F. A known volume of the batter was weighed and the batter was transferred in 230 gm. portions to 6 inch pans and baked at 375° F. for 27 minutes. After cooling, the cakes were scored subjectively, using the system of the American Institute of Baking which is a summary of the factors of symmetry, volume, crust and crumb color, grain, texture, flavor and aroma and eating quality. Comparative volume of the layers were determined by rape seed displacement.

The comparisons of the cakes are tabulated below in Table II and demonstrate the efficient batter aeration and cake quality improvement achieved by the addition of typical emulsification agents of the invention. The preparations were incorporated into the formula as dry powders or hydrated with the absorption water and compared with the same level of the active ingredients not in admixture with the hydrogenated triglycerides (preparations coded numerically with an A suffix) in powdered or liquid dispersion form.

TABLE II

| Code | Physical form | Percent (flour basis) | Specific gravity (batter) | Quality score | Cake volume (cc.) |
|---|---|---|---|---|---|
| Control | | | 1.19 | 87 | 570 |
| 1 | D. | 3.0 | .96 | 96 | 610 |
| 1A | U.I. | | 1.04 | 92 | 590 |
| 2 | D. | 5.0 | .98 | 95 | 600 |
| 2A | U.I. | | 1.07 | 94 | 590 |
| 9 | D. | 4.0 | .92 | 97 | 590 |
| 9A | U.I. | | .99 | 94 | 600 |
| 11 | L. | 0.5 | 1.08 | 91 | 590 |
| 11A | U.I. | | 1.12 | 87 | 570 |
| 12 | D. | 3.0 | .91 | 97 | 610 |
| 12A | U.I. | | .98 | 92 | 600 |
| 13 | L. | 2.0 | .89 | 95 | 590 |
| 13A | U.I. | | 1.01 | 94 | 590 |
| 15 | D. | 2.0 | .88 | 97 | 610 |
| 15A | U.I. | | .97 | 93 | 600 |
| 17 | D. | 2.0 | .92 | 96 | 590 |
| 17A | U.I. | | 1.04 | 94 | 590 |

NOTE.—Abbreviations: D.—dry free flowing powder; L.—liquid dispersion with absorption water: U.I.—untreated ingredients, active emulsifier levels equivalent to the active emulsifiers in the novel emulsification agents.

The enhanced utility of the emulsification agents of this invention is further demonstrated in a jelly roll mix. This cake mix is prepared by blending the following ingredients in finely divided form in their respective quantities.

Ingredient: Baker's percent
- Cake flour _____ 100.0
- Invert sugar _____ 7.8
- Granulated sugar _____ 116.4
- Non-fat dry milk _____ 4.9
- Salt _____ 2.9
- Baking powder _____ 5.8
- Vanilla _____ 0.4
- Emulsifier _____ 1.0–3.5
- Dried whole eggs _____ 4.8

The emulsifier agent is added as a finely divided powder. After the ingredients are uniformly mixed, the blend is packaged in a polyethylene container. The package instructions require blending with the prepared mix ingredients an amount of water equivalent to 100 baker's percent within a period of from 5 to 8 minutes using a wire whip, and that thereafter the batter is baked for 8 to 10 minutes at 400° F.

The comparisons of the cakes containing preparations 2, 7, 8, 11, 12, 14, 17 and 18 are presented in Table III below and clearly evidence the quality improvement achieved by the emulsifier agents as compared with a no additive control and the same level of the active ingredients not in admixture with the triglyceride component of the invention (the latter ingredients identified numerically with a suffix A).

TABLE III

| Code | Percent (flour basis) | Specific gravity (batter) | Quality score | Volume (cc.) |
|---|---|---|---|---|
| Control | | 1.27 | 84 | 710 |
| 2 | 3.5 | .93 | 96 | 760 |
| 2A | 3.5 | .98 | 93 | 740 |
| 7 | 3.5 | .87 | 95 | 750 |
| 7A | 3.5 | .94 | 94 | 740 |
| 8 | 2.0 | .91 | 95 | 730 |
| 8A | 2.0 | .99 | 91 | 770 |
| 11 | 1.0 | 1.06 | 93 | 740 |
| 11A | 1.0 | 1.04 | 95 | 750 |
| 12 | 2.5 | .93 | 96 | 760 |
| 12A | 2.5 | .96 | 94 | 740 |
| 14 | 1.5 | 1.04 | 92 | 740 |
| 14A | 1.5 | 1.00 | 89 | 710 |
| 17 | 3.0 | .91 | 94 | 790 |
| 17A | 3.0 | .98 | 88 | 730 |
| 18 | 3.5 | .87 | 97 | 810 |
| 18A | 3.5 | .94 | 94 | 750 |

The various mixtures can be employed in numerous baked food products in the dry powdered, relatively non-hygroscopic form or hydrated just previous to incorporation in preparing icings, fillings, creams (as for cream layers and other uses in cakes, candy fillings and fondants. In particular, the dry powdered form may be advantageously employed in dry powdered mixes for puddings such as corn starch and chocolate puddings, fillings for pies. They can also be employed in other carbohydrate and protein containing comestibles such as candy fillings, carbohydrate-based bakery products embracing baked carbohydrate products as well as fillings and icings for cakes, and also desserts such as puddings, confections, ice cream and ice milk.

Baked carbohydrate food products intends the products of the type covered in the earlier examples which illustrate bread, cake, cake mixes, and includes also fillings and creams and icings for cakes and also pies, pancakes, biscuits and rolls.

It has thus been found that the invention described provides a significant improvement in functional efficiency and facilitates the physical handling of the emulsification agents in scaling, addition to the mixer or blender, ingrediator, broth or shortening tank depending on the type of process involved. Being relatively free flowing with a minimum of caking in storage, the compositions offer enhanced functionality which is apparently resultant from employing the appropriate ratio range of the polyol esters and their derivatives with the triglyceride component resulting in synergism. Better dispersions are evident particularly in the sponge and dough and the continuous mix method of bread making. The products of this invention disperse in water with minimal agitation and foaming which accounts for greater utility in continuous mix manufactured bread where it is advantageous to add the emulsifier agent to the broth thus allowing greater time of contact with the proteinaceous and carbohydrate components of the system.

In addition to the improved physical properties of this novel composition of matter in storing, scaling and handling, it was found quite apparent that the particulate, free flowing compositions dispersed in the product forming ingredients in an improved manner resulting in doughs or batters exhibiting greater tolerance to mechanical abuse and baked products having improved external and internal characteristics and crumb softness.

What is claimed is:

1. An emulsification composition whose essential coacting emulsifying constituents consist essentially of:
    (a) from 20 to 80 parts by weight of at least one of the mono-propylene glycol, mono- or mono- and di-glycerol or sorbitol esters of the fatty acids having from 10 to 24 carbons, the lactylated, succinylated or acetylated tartaric acid esters of mono- or mono- and di-glycerides of said fatty acids and
    (b) from 80 to 20 parts by weight of at least one polyoxyethylene derivative of any of said mono- or mono- and di-esters of fatty acids and having a total of from about 5 to 100 moles of ethylene oxide per mole of said esters of fatty acids; and
    (c) a hydrogenated triglyceride to the extent of from 20 to 80 weight percent of said composition; said composition being in powdered form and effective to enhance at least some one of the characteristics and quality of at least some carbohydrate food products, carbohydrate containing confections, and prepared food mixes, more than can the same content of the said esters of the fatty acids alone.

2. An emulsification composition as set forth in claim 1 wherein said esters of fatty acids are comprised of monoglycerides containing approximately 40% to 90% alpha monoester and the balance diglycerides with a small percentage of triglycerides, said monoglyceride being prepared from edible parent fat sources which may or may not be hydrogenated.

3. An emulsification composition as set forth in claim 1 wherein said polyoxyalkylene derivatives are represented by polyoxyethylene ($n$) glyceryl monostearate or monopalmitate and polyoxyethylene($n$) sorbitan monostearate or monopalmitate, in either of which $n$ can be from about five (5) to one hundred (100), and including mixtures of any of them.

4. An emulsification composition as set forth in claim 1 wherein said polyoxyethylene derivatives of the esters of fatty acids are condensation products of from 10 to 95 parts by weight of ethylene oxide and correspondingly from 90 to 5 parts by weight of a partial glycerol ester of a $C_{10}$–$C_{24}$ fatty acid containing at least 10 weight percent monoglyceride content with diglycerides, triglycerides and glycerine constituting the balance.

5. An emulsification composition as set forth in claim 1 wherein said triglycerides constitute a product resultant from substantially complete hydrogenation of edible fats or oils exhibiting a melting point in the range of 125° F. to 165° F.

6. An emulsification composition as set forth in claim 1, which is additionally protected from agglomerating by including an anti-caking agent, up to and including a level of 10 percent.

7. An emulsification composition as set forth in claim 1 in hydrated form.

References Cited
UNITED STATES PATENTS

| | | | |
|---|---|---|---|
| 2,257,545 | 9/1941 | Curtis | 252—140 X |
| 2,808,336 | 10/1957 | Kalish | 99—123 X |
| 3,034,898 | 5/1962 | Kuhrt et al. | 252—356 X |

RICHARD D. LOVERING, Primary Examiner

U.S. Cl. X.R.

99—91, 92; 252—352, Dig. 1